Oct. 6, 1931. R. D. NYE 1,825,815
REVERSING VALVE AND EQUIPMENT FOR COMBUSTION CONTROL
Filed June 11, 1928 3 Sheets-Sheet 1

Inventor
R. D. Nye
By Harry Frease
Attorney

Oct. 6, 1931.  R. D. NYE  1,825,815
REVERSING VALVE AND EQUIPMENT FOR COMBUSTION CONTROL
Filed June 11, 1928  3 Sheets-Sheet 2

Inventor
R.D. Nye
By Harry Frease
Attorney

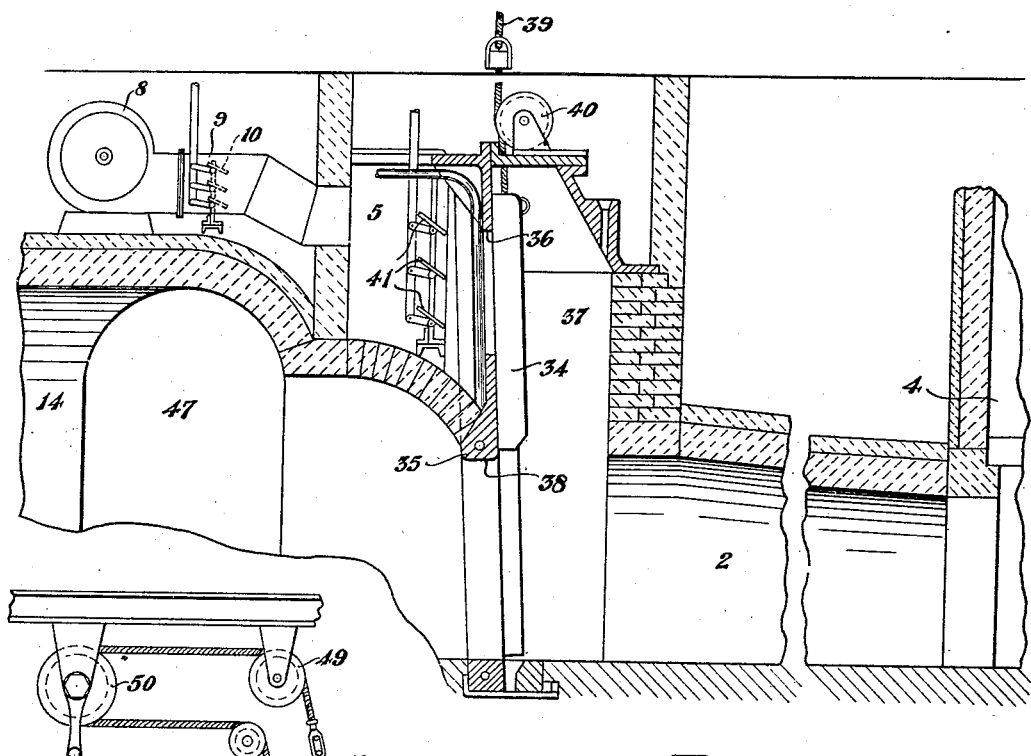

Patented Oct. 6, 1931

1,825,815

UNITED STATES PATENT OFFICE

RALPH D. NYE, OF COLUMBUS, OHIO

REVERSING VALVE AND EQUIPMENT FOR COMBUSTION CONTROL

Application filed June 11, 1928. Serial No. 284,303.

The invention relates to the control of combustion for open hearth furnaces and regenerative furnaces or the like, and more particularly to means in which four gate valves control the entire reversing of producer gas and air to both sides of the furnace, and to means whereby a balanced draft control of the furnace may be maintained.

The object of the present improvement is to provide a simplified combustion control in which only four gate valves are required to accomplish the reversing of the air and producer gas supplied to the furnace.

A further object is to provide for a balanced draft control of the furnace, fans being used to regulate air in proper proportion to gas burned as indicated by gauges and the like, operatively connected with both sides of the furnace in order that a balance may be maintained between the inlet and outlet ends of the furnace.

A still further object is to provide means for sealing the producer gas reversing valves when shutting off this gas from either end of the furnace and means for quickly breaking this seal when the valve is reversed.

Figure 1:
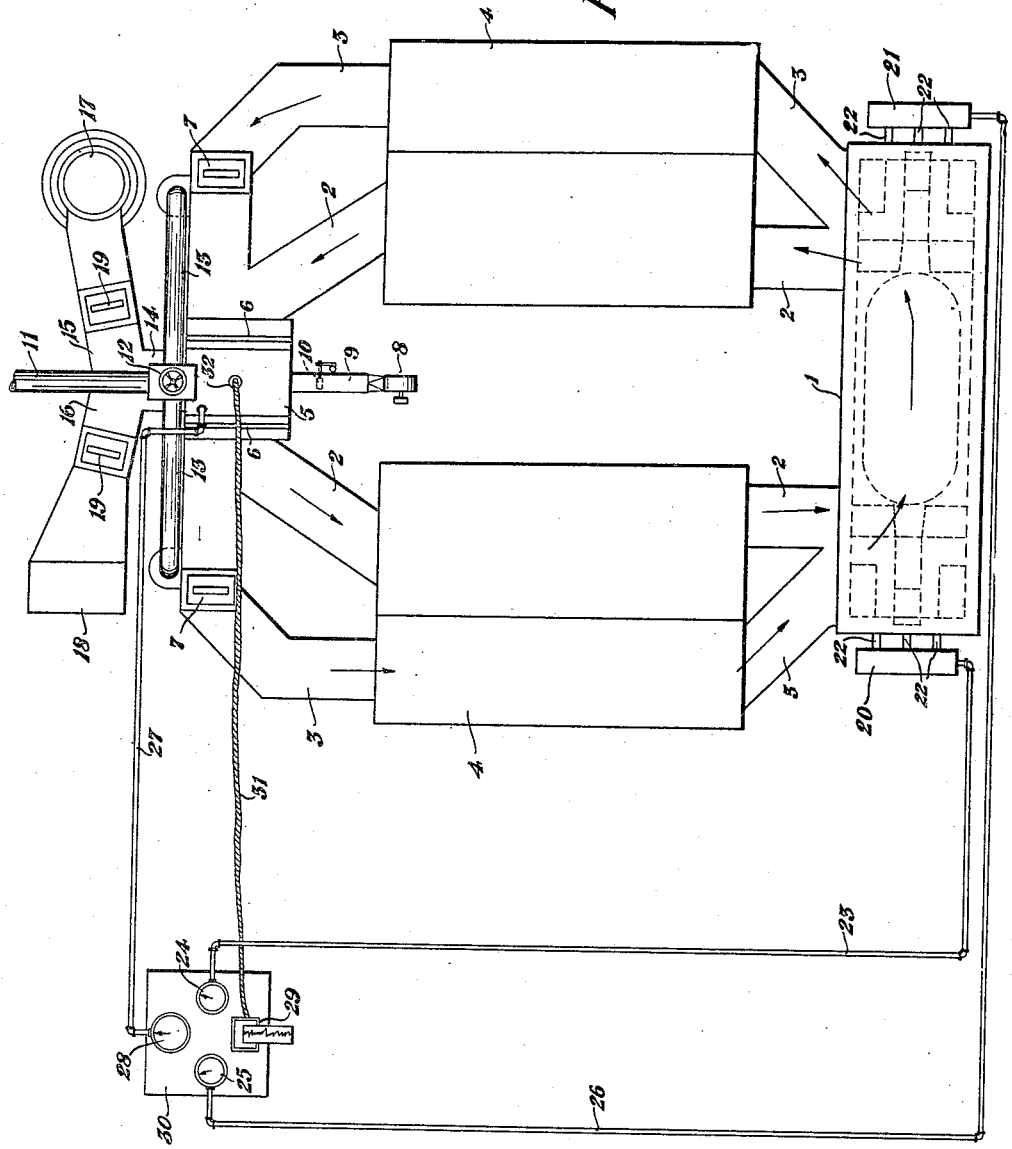
Figure 2:
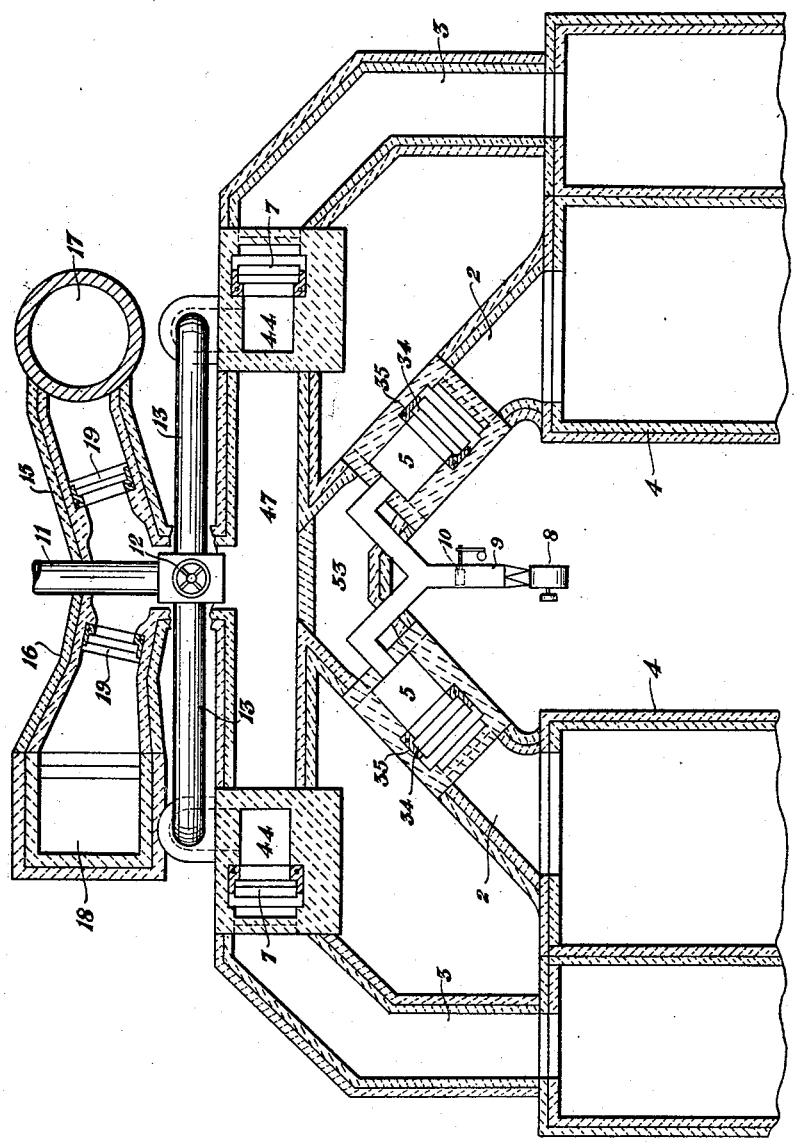

The above and other objects may be attained with a construction such as illustrated in the accompanying drawings, in which Figure 1 is a diagrammatic plan view of an open hearth furnace showing the improved reversing apparatus and the balanced control mechanism applied thereto;

Fig. 2, an enlarged fragmentary plan section through the reversing valve mechanism showing a slightly different arrangement of the parts;

Fig. 3, an enlarged detail sectional view through one of the air reversing valves and the associated parts; and Fig. 4, a similar view of one of the gas reversing valves.

Similar numerals refer to similar parts throughout the drawings.

Referring first to Fig. 1 of the drawings, an ordinary open hearth furnace is illustrated generally at 1 and communicates at each end with the air tunnels 2 and gas tunnels 3. The respective tunnels extend through the regenerators 4.

At the other side of the regenerators the tunnels 2 and 3 may communicate with a centralized control chamber 5. Reversing valves 6 may be located therein for controlling the air and reversing valves 7 may be located in the gas tunnels 3 for controlling the passage of gas therethrough.

The valves 6 and 7 are both preferably sliding gate valves arranged to slide upon double ported seats.

A blowing device such as the fan shown generally at 8 may be located adjacent to and communicating with the centralized air box 5 of the reversing valve as by the conduit 9, a plurality of adjustable gates 10 being provided in said conduit for controlling the air supplied by the fan to the air box and thence through the reversing valve to the furnace. (See also Fig. 3.)

Producer gas may be supplied through a pipe 11 connected, as through the regulating valve 12, with the branch pipes 13 communicating with the gas tunnels 3.

The centralized control chamber 5 communicates with the discharge neck 14 having the branch conduits 15 and 16 leading to the stack 17 and a waste heat boiler 18 respectively.

Valves 19 may be located in said conduits for dampering off either the stack or waste heat boiler or both and thus regulating the amount of draft applied to the furnace.

Draft headers 20 and 21 are connected to opposite ends of the furnace, communicating therewith as through a plurality of tubes 22. The pipe 23 connects the header 20 with a gauge 24 for registering the pressure at one end of and within the furnace with respect to the atmospheric pressure outside of the furnace and a similar gauge 25 is connected as by the pipe 26 with the header 21 at the other end of the furnace for the same purpose.

A pipe 27 connects the centralized control chamber 5 with a pressure gauge 28 for registering the air pressure with respect to the atmosphere within the air box of the air reversing valve.

A recording pyrometer 29 may also be mounted upon the panel board 30, upon which the gauges are mounted, and is connected as by the wire 31 with a thermocouple 32 for registering and recording the temperature of the waste gases flowing from furnace regenerators.

With this construction, an accurate balanced control of the furnace may be maintained. Assuming for instance that the air and gas are passing in the direction of the arrows shown in Fig. 1, there would be a positive or plus pressure at the end of the furnace upon the draft header 20 which would be recorded upon the gauge 24 and a negative or minus pressure at the opposite end of the furnace which would be recorded upon the gauge 25.

Having the plus and minus signs marked upon the gauge dials to right and left of the zero or atmospheric pressure enables the furnace operator to determine adjustments of the valves and rate of combustion.

The temperature of the waste gases in the centralized control chamber would be recorded upon the pyrometer and the air pressure in the air box of the reversing valve upon the gauge 28. The valves 6 and 7 could then be reversed as often as necessary in order to maintain the desired temperature and the proper pressure of air applied together as necessary as indicated upon the panel board to secure maximum combustion efficiency.

As shown in Fig. 2, the air tunnels 2 may communicate with an air box 33 and each air tunnel may be provided with a sliding gate valve 34 mounted in a double ported valve seat 35. The other portions of the apparatus may be substantially the same as shown in Fig. 1.

As shown in Fig. 3, the valve seat 35 has the upper port 36 communicating with the air box and with the upright passage 37 which communicates with the tunnel 2; and the lower port 38 forming a communication between the tunnel 2 and the passage 14 leading to the stack.

The gate valve 34 may be raised and lowered to close either port 36 or 38, as desired, by any suitable and well known operating mechanism connected to the cable 39, a pulley 40 engaging the cable and tending to hold the gate valve in sliding engagement with the double ported valve seat, as it is raised and lowered.

If desired, a plurality of adjustable gates 41 may be arranged between the air supply and the upper port 36 to balance the air supplied to each end of the furnace.

As shown in Fig. 4, each gas valve 7 may also be in the form of a gate valve slidably mounted upon the double ported valve seat 42, having the upper port 43 communicating with the gas inlet chamber 44 and with the upright passage 45 which communicates with the adjacent tunnel 3.

The lower port 46 is provided to afford communication between the tunnel 3 and the discharge passage 47 communicating with the stack.

Each gas valve 7 may be raised and lowered as by a cable 48 extending upward over a pulley 49 and operatively connected to any suitable operating mechanism such as shown at 50.

A return cable 51 may be connected to the cable 48 as shown in Fig. 4, for assisting in unsealing the valve when the same is lowered from the gas port.

It should be understood that a considerable amount of tar accumulates upon the gas valve and valve seat and in order to cause the valve to seat tightly to form a seal, a spring operated lever 52 may be provided, the spring 53 tending to throw the lower end of the lever toward the valve and hold the roller 54 in engagement therewith, thus assuring a sealing of the valve when in the raised position as shown in Fig. 4.

The upper and lower edges of the gas valve may be beveled as shown at 55 and the movement of the spring operated lever 52 may be limited as by the collar 56, thus permitting the valve to move into and out of engagement with the roller as the same is raised and lowered. The bottom of the valve seat for the port 46 is channel shaped as shown at 57 and has its outer face bevelled as at 58. Thus when the valve 7 is lowered over the port 46 its lower bevelled edge 55 wedgeably engages the bevelled face 58 and holds the valve 7 tightly against its seat.

From the above it will be seen that the four gate valves 7—7 and 34—34 control the entire operation of the gas and air through the furnace.

By raising the valves 7 and 34 upon one side of the furnace and lowering the valves upon the other side thereof, the flow of gas and air may be maintained in one direction until the positions of the four valves are reversed to reverse the flow.

Also it will be seen that by using the centralized control chamber (Fig. 1) the air as it is forced into the furnace must flow through this chamber in such a manner that it may be preheated before entering the checker chamber.

It is apparent that the pressure of the gases flowing from the furnace acts to force the closed gas valve against its seat and counterbalances the pressure of the incoming gas on the other side of the valve so that any tendency for gas to leak through the valve is reduced.

I claim:

1. Reversing valve structure including a double ported valve seat, a gate valve slidably mounted thereon, means for slidably moving the valve to register with either port, lever actuated roller means for holding the valve in sealing contact with the valve seat when closing one port, and wedge means for holding the valve in sealing contact with the valve seat when closing the other port.

2. Reversing valve structure including a double ported valve seat, a gate valve slidably mounted thereon, means for slidably moving the valve to register with either port, lever actuated roller means for holding the valve in sealing contact with the valve seat when closing one port, wedge means for holding the valve in sealing contact with the valve seat when closing the other port, and means connected with the valve moving means for assisting in opening the valve.

3. Reversing valve structure including a double ported valve seat, a gate valve slidably mounted thereon, means for slidably moving the valve to close either port, a chamber for preheating incoming gases communicating with one port, a discharge duct communicating with the other port, a duct for transmitting incoming or outgoing gases and adapted to communicate with both ports, means for forcing gases into the preheating chamber, lever actuated roller means for holding the valve in contact with the valve seat when closing the one port, and wedge means for holding the valve in contact with the valve seat when closing the other port.

4. Reversing valve structure including a double ported valve seat, a gate valve slidably mounted thereon, means for slidably moving the valve to close either port, a chamber for preheating incoming gases communicating with one port, a discharge duct communicating with the other port, a duct for transmitting incoming or outgoing gases and adapted to communicate with both ports, means for forcing gases into the preheating chamber, lever actuated roller means for holding the valve in contact with the valve seat when closing the one port, and wedge means for holding the valve in contact with the valve seat when closing the other port, the pressure of the outgoing gases in the duct adapted to communicate with both ports when the valve registers with the preheating chamber port acting to force the valve against its valve seat and counter-balance the pressure of the incoming gases in the preheating chamber.

In testimony that I claim the above, I have hereunto subscribed my name.

RALPH D. NYE.